Patented July 13, 1943

2,324,450

UNITED STATES PATENT OFFICE 2,324,450

MELAMINE PURIFICATION

Andrews C. Wintringham, Glen Ridge, and Victor L. King, Bound Brook, N. J., assignors to American Cyanamid Company, New York, N. Y., a corporation of Maine No Drawing. Application February 26, 1941, Serial No. 380,618

5 Claims. (Cl. 260—248)

This invention relates to the purification of melamine prepared by processes which involve the heating of cyanamide or dicyandiamide in a solvent comprising liquid ammonia at high temperatures and pressures. A principal object of the invention resides in the production of a substantially iron-free melamine suitable for lacquer manufacture from the melamine prepared by such processes.

It is known that a melamine product of relatively high purity can be obtained by heating a mixture of about 1 part of cyanamide or dicyandiamide with from 1 to 2 parts of liquid ammonia in an autoclave, with or without the addition of anhydrous methanol or other diluents to reduce the autoclave pressure. In ordinary commercial manufacture it has been the practice, after the heating is completed, to discharge the contents of the autoclave through a filter which separates the solid melamine product from the liquid ammonia or other solvent mixture, and then to wash the solids collected on the filter with water. When this procedure is followed it is necessary to recrystallize the resulting melamine product from boiling water, with or without the addition of caustic soda solution, if a pure product is desired.

In the copending application of Victor L. King, one of the present inventors, Serial No. 344,638, filed July 10, 1940, it is pointed out that resins and lacquers made by condensing melamine prepared by the above-described autoclave process with formaldehyde are inferior in quality to those prepared from melamine manufactured by other and less efficient processes. In that application it is pointed out that the autoclave product exhibits a considerably higher alkalinity upon solution in hot water than does melamine prepared by other methods, and reasons are stated why this alkalinity is believed to be due to the presence of small quantities of intermediate conversion products of cyanamide and dicyandiamide such as guanidine, biguanide, guanylurea and similar amidines. Moreover, it is shown by the actual addition of small quantities of guanidine and guanylurea to pure melamine that the presence of these compounds renders the melamine unsuitable for lacquer manufacture. The claims of that application are directed to a process of purifying the melamine by discharging the autoclave product directly into a solvent for the amidines which does not dissolve substantial amounts of melamine, whereby the impurities are separated without resorting to solution and recrystallization of the entire batch.

The present invention is an improvement over the process described in the above-entitled application, and is directed specifically to the removal of both iron and amidines from melamine prepared by the autoclave process. It has been found that melamine from this source is frequently contaminated by iron in a form which is soluble in the alcohol-ammonia mixture, and when the contents of the autoclave are discharged into water the ammonia and the alkaline impurities cause this iron to be precipitated along with the melamine. This is highly objectionable, since an iron-free melamine is desired for many purposes, and particularly for the manufacture of high-grade lacquers.

We have now discovered that a substantially iron-free melamine can be obtained by the process of the application above referred to if the freshly prepared melamine is discharged into or washed with water having dissolved therein a small amount of an organic hydroxy compound capable of forming a complex, water-soluble iron salt. We have found that organic hydroxy compounds of the type of organic hydroxy acids and dicarboxylic acids such as tartaric acid, malic acid, citric acid, oxalic acid and the like, and polyhydric alcohols such as glycerol, ethylene glycol, sorbitol, erythritol, mannitol, sugars such as cerelose, corn syrup and the like, which are known to form complex water-soluble iron salts in which the iron is present in the form of a complex anion, will effectively prevent the precipitation of the iron present as an impurity in the melamine, even though the solution may contain large quantities of ammonia and small quantities of amidines and dissolved melamine from the autoclave charge. By washing the freshly prepared melamine containing both iron and amidines as impurities with a solution of one or more of the above hydroxy compounds in water before the melamine collects in the form of a solid cake, we are therefore able to dissolve out both the amidines and the iron, leaving a substantially iron-free melamine suitable for lacquer manufacture which can be separated by decantation of the solution or by ordinary filtration procedures.

In practicing our process according to one preferred modification thereof a charge consisting of a solution of dicyandiamide in about an equal weight of liquid ammonia, with or without the addition of anhydrous methanol or other suitable diluent, is heated in an autoclave at temperatures of about 120–220° C., and preferably at 160–200° C., for several hours until the desired melamine product has been formed. The entire autoclave charge is then blown directly into a drowning tank in which has been placed a quantity of water sufficient to form a pumpable slurry with the melamine product and preferably also sufficient to dissolve all the ammonia. This water has dissolved therein a small quantity of an organic hydroxy compound capable of forming a complex, water-soluble iron salt, preferably tartaric acid, the amount used being preferably on the order of 0.1% of the combined weight of the water and the autoclave charge. Larger or smaller amounts of tartaric acid or other hydroxy compound may of course be used, the object being to have present a quantity sufficient to combine with the estimated amount of iron present in the autoclave charge.

After the solid contents of the autoclave have been discharged into the dilute aqueous tartaric acid solution the resulting slurry is cooled and washed by agitation and can then be safely collected on a filter and washed with other solvents in the usual manner. The purpose of cooling the solution is of course to reduce the solubility of melamine in the water, so that less melamine is lost by the washing process. Surprising as it may seem, we have found that the step of discharging the entire contents of the autoclave, including solids, liquids and gases, directly into a body of water having an organic hydroxy compound such as tartaric acid dissolved therein is in itself sufficient to insure the production of an iron-free melamine product useful for lacquer manufacture instead of the alkaline product containing guanidine or other amidines that forms resins and lacquers of inferior quality. Once this step has been taken, both the iron and the amidines are removed when the slurry is filtered and washed in the usual manner.

The invention will be illustrated in greater detail by the following specific example. It should be understood, however, that this example is given primarily for purposes of illustration and that the invention in its broader aspects is not limited thereto.

*Example*

1465 pounds of dicyandiamide were dissolved in 2637 pounds of alcohol-ammonia solution, analyzing 54% ammonia and 46% methanol. This charge was pumped into a large autoclave and heated to 180–200° C. for several hours at a pressure of 1600–1900 lbs./sq. in.

The autoclave charge was then blown into a quenching tank containing 6000 lbs. of water having 10 lbs. of tartaric acid dissolved therein during a period of about 15 minutes. The solution in the quenching tank was then agitated and cooled by recirculation through a cooler until the temperature was lowered sufficiently to reduce excessive losses of melamine, while retaining dicyandiamide in solution, a temperature range of 40–70° C. being suitable, and was then filtered in a filter press. The mother liquor was passed through a stripping column in which the alcohol and ammonia were recovered.

The melamine in the filter press was washed with about 12,000 lbs. of water. 10 pounds of tartaric acid was then dissolved in the wash water and the solution was placed in the quenching tank to drown the discharge of the next batch of melamine from the autoclave. By reusing the wash water in this manner it was possible to prevent loss of melamine dissolved from the filter press.

After the washing in the filter press was completed the batch was spread out and dried at temperatures of about 100° C. A pure white product was obtained which exhibited a pH in water solutions of 7.9 and containing 98% melamine. No guanidine or guanylurea was found in the product. A sample of crude melamine taken from the autoclave without washing was found to contain about 200 parts per million of iron whereas the product purified according to the procedure of this example contained less than 20 parts per million of iron.

A butylated melamine-formaldehyde lacquer was prepared from this product by the following method: 126 grams of the above batch of melamine were mixed with 405.5 grams of 37% aqueous formaldehyde solution and 440 grams of anhydrous butanol and the mixture was heated to boiling in a flask fitted with a charging funnel and a condenser. A mixture of butanol and water was distilled off, and further replacements of butanol were added at 15 minute intervals. A total of 1150 grams of butanol were added in this manner during a period of about 2 hours, after which a vacuum was applied and the heating continued until the distillate was anhydrous. A yield of 476 grams of a butylated melamine-formaldehyde lacquer was obtained which was diluted with 154 grams of xylene, mixed with 6.5 grams of diatomaceous earth and filtered. A clear and haze-free lacquer was obtained, indicating that the melamine was free from guanidine and guanylurea.

What we claim is:

1. A process for the manufacture of a substantially iron-free melamine suitable for lacquer manufacture which comprises heating a member of the group consisting of cyanamide and dicyandiamide in a solvent comprising liquid ammonia until a melamine containing intermediate conversion products has been formed, discharging the product into water having dissolved therein a small amount of an organic hydroxy compound capable of forming a complex water-soluble iron salt, and separating the melamine from the resulting solution.

2. A process for the manufacture of a substantially iron-free melamine suitable for lacquer manufacture which comprises heating a member of the group consisting of cyanamide and dicyandiamide in a solvent comprising liquid ammonia until a melamine containing intermediate conversion products has been formed, discharging the product into water having dissolved therein a small amount of a hydroxy carboxylic acid, and separating the melamine from the resulting solution.

3. A method of purifying a freshly prepared melamine product containing both iron and amidines as impurities which comprises first preparing a wash water solution by dissolving in water a small quantity of an organic hydroxy compound capable of forming a complex, water-soluble iron salt and then washing the melamine product with said wash water solution before it collects in the form of a cake.

4. A method of purifying a freshly prepared melamine product containing both iron and amidines as impurities which comprises the step of washing the product with a dilute aqueous solution of tartaric acid before it collects in the form of a solid cake.

5. A method of purifying a freshly prepared melamine product containing both iron and amidines as impurities which comprises the step of washing the product with a dilute aqueous solution of mannitol before it collects in the form of a solid cake.

ANDREWS C. WINTRINGHAM.
VICTOR L. KING.